Sept. 15, 1959 M. E. MALCHOW 2,904,678

SEMI-CONDUCTOR SQUELCH CIRCUIT

Original Filed Nov. 1, 1954 2 Sheets-Sheet 1

INVENTOR.
Max E. Malchow
BY H. O. Newton
ATTORNEY

Sept. 15, 1959 M. E. MALCHOW 2,904,678

SEMI-CONDUCTOR SQUELCH CIRCUIT

Original Filed Nov. 1, 1954 2 Sheets-Sheet 2

INVENTOR.
Max E. Malchow
BY
H. L. Newton
ATTORNEY.

United States Patent Office 2,904,678

Patented Sept. 15, 1959

2,904,678

SEMI-CONDUCTOR SQUELCH CIRCUIT

Max E. Malchow, Pennsauken, N.J., assignor to Radio Corporation of America, a corporation of Delaware Continuation of abandoned application Serial No. 465,917, November 1, 1954. This application December 10, 1958, Serial No. 779,805

12 Claims. (Cl. 250—20)

Figure 1:
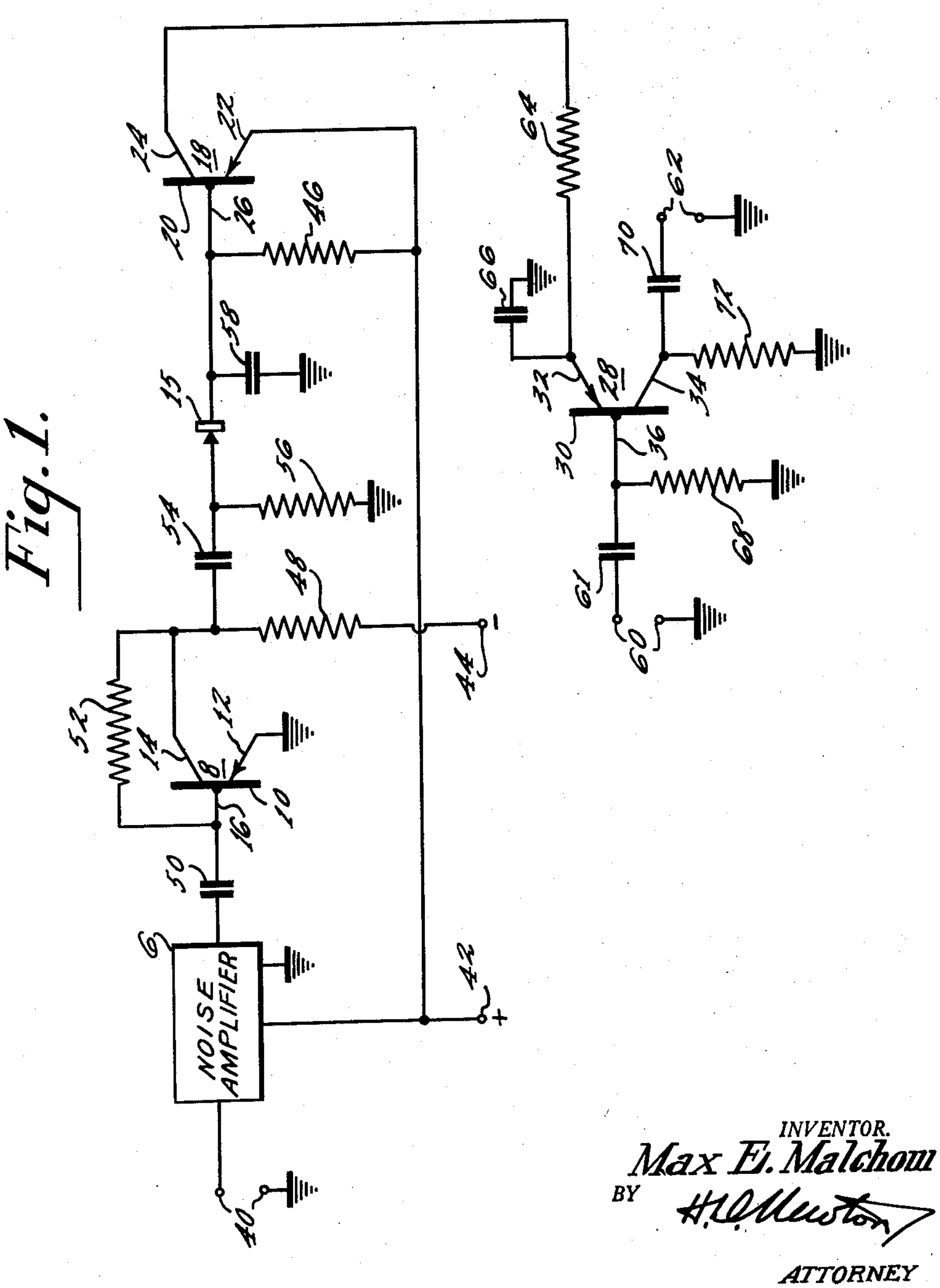

This invention relates to noise suppression or squelch circuits for radio signal receivers and the like, and in particular to circuits of the type referred to for signal receivers utilizing semi-conductor devices as signal translating and amplifying elements.

This application is a continuation of my copending application entitled "Semi-Conductor Squelch Circuit," filed November 1, 1954, Serial No. 465,917, and assigned to the assignee of the present application, now abandoned.

Radio signal receivers employing electron discharge devices in the signal translating and amplifying portions thereof are often provided with squelch and noise suppression circuits for reducing the effect of undesired noise in the reception of signal energy. The purpose of these circuits is, in general, to squelch or quiet the receiver when sufficient signal energy for satisfactory reception is not present. Where the transmission of signal energy is not continuous but the radio receiver must always be ready to receive a signal, as for example, in police service, a squelch circuit performs the important function of removing the large amount of noise that otherwise might be present in the absence of carrier wave energy.

In other radio receivers, such as those employed in homes or automobiles, in which tuning through a relatively wide band of frequencies is desired, a squelch circuit will aid in the supression of interstation noise. A number of different circuit arrangements have been employed in the past in radio receivers to suppress noise. Generally, these circuits employ some means to render the audio frequency signal amplifier of the receiver nonconductive until a signal is received having a magnitude which exceeds a predetermined threshold level.

Where signal receivers are installed in automobiles, the energizing voltages for the signal translating and amplifying elements may be obtained from the ignition system battery, which is maintained in a charged state by the automobile generator. One advantage of such receivers which utilize semi-conductor devices, such as transistors, is that the automobile battery voltage is sufficient to provide biasing voltages for the transistors. Hence, it is not generally necessary to increase the battery voltage by means of a vibrator. In such receivers, however, the available biasing voltage will vary as the generator cuts in and out due to variations in engine speed. As a result, the input signal threshold of the receiver may also vary. This is, of course, undesirable.

It is, accordingly, an object of the present invention to provide an improved squelch circuit for radio signal receivers and the like employing semi-conductor devices.

It is another object of the present invention to provide a squelch circuit for a transistorized signal receiver which functions automatically to render the receiver operative when a received carrier wave attains a predetermined amplitude level.

It is a further object of the present invention to provide, in a signal receiver employing transistors, noise suppression means wherein the input signal threshold does not vary as the supply voltage varies for any reason.

These and further objects and advantages of the present invention are achieved in a transistorized radio receiver in which the undesired noise is amplified and then rectified by a diode. The rectified noise signal is then used to vary the base bias of a transistor which serves as a switch between the audio amplifier section of the receiver and the noise amplifier. The switch transistor is, accordingly, biased off when the noise increases to a predetermined level. In this way, the switch transistor represents a high impedance between the voltage supply and an audio amplifier transistor and prevents the application of bias voltage to the audio amplifier transistor. In this manner, efficient and effective squelch action is achieved. The diode rectifier is so arranged, in accordance with the invention, that its bias voltage varies with variations in the supply voltage, insuring thereby a substantially constant threshold signal at which the switch opens and closes.

Figure 2:
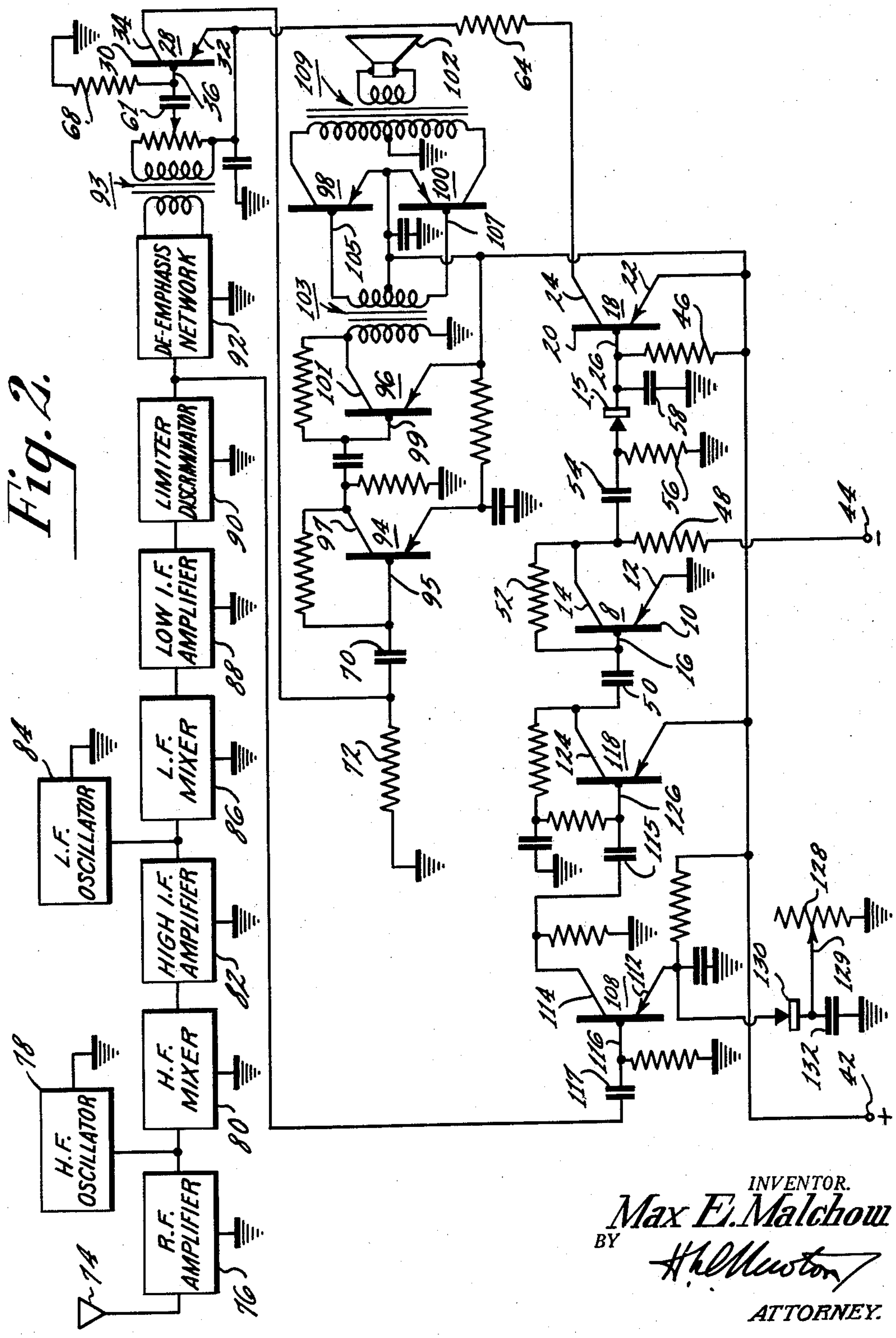

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing, in which:

Figure 1 is a schematic circuit diagram of a transistor noise and audio amplifier for a radio signal receiver in accordance with the invention; and Figure 2 is a schematic circuit diagram of a radio signal receiver partly in block form embodying a circuit of the type illustrated in Figure 1 in accordance with the invention.

Referring now to the drawing, wherein like parts are indicated by like reference numerals in both figures, and referring particularly to Figure 1, the noise and audio frequency amplifying sections of a radio signal receiver include, in general, a noise amplifier 6, a first transistor noise amplifier 8, a diode rectifier 15, a switch transistor 18 and an audio amplifier transistor 28. The transistors may each be considered to be junction transistors of the P–N–P type and comprise a semi-conductive body with which three electrodes are cooperatively associated in a well known manner. The first transistor noise amplifier 8 includes a semi-conductive body 10 and three electrodes which are designated, as is conventional, as an emitter 12, a collector 14 and a base 16. The switch transistor 18 also includes a semiconductive body 20 and an emitter 22, a collector 24 and a base 26. In the same manner, the audio frequency amplifier transistor 28 has a semi-conductive body 30 and an emitter 32, a collector 34 and a base 36.

Noise signals may be applied to the circuit at the input terminals 40, one of which is connected to a point of fixed reference potential, or ground for the system, and the other of which is connected to the input of the noise amplifier 6. The noise amplifier 6, it should be understood, could be any type signal amplifying device such as a transistor or a vacuum tube. Emitter biasing potential for the switch transistor 18 and reverse biasing potential for the diode 15 is obtained from a terminal 42 which may be connected to the automobile ignition supply voltage (not shown). To this end, the emitter 22 of the switch transistor is connected directly with the positive terminal of the supply voltage, while the cathode of the diode 15 is connected through a resistor 46 to the positive terminal of the supply voltage. Normally, twelve to fifteen volts (positive) are sufficient for this purpose. Collector biasing potentials for the transistor 8 are obtained from a terminal 44 which is also connected to the automobile ignition system supply voltage. To this end, the collector 14 of the transistor 8 is connected through a resistor 48 to the negative terminal of the supply voltage.

The output circuit of the noise amplifier 6 is connected through a coupling capacitor 50 to the base 16 of the first transistor noise amplifier 8. A stabilizing resistor 52 is connected between the collector 14 and the base 16 of this transistor, while its emitter 12 is grounded. The collector or output electrode 14 of the transistor 8 is connected through a coupling capacitor 54 to the anode of the diode rectifier 15. The anode of the diode 15 is also connected, in accordance with one feature of the invention, to ground through a resistor 56.

The cathode of the diode 15 is connected directly with the base 26 of the switch transistor 18. To by-pass unwanted signal energy to ground, a by-pass capacitor 58 is connected between the cathode of the diode 15 and ground. The cathode of the diode 15 is also returned, in accordance with the invention and as was mentioned hereinbefore, through the resistor 46 to the positive terminal of the supply voltage as indicated at the terminal 42. Thus, the diode 15 is normally biased in the reverse or relatively non-conducting direction.

The input circuit for the audio amplifier transistor 28 includes a pair of input terminals 60, one of which is grounded and the other of which is connected through a coupling capacitor 61 to the base 36. Accordingly, an audio frequency signal may be applied at the terminals 60 to the base 36. A biasing resistor 68 is also connected between the base 26 and ground. The output circuit for the audio frequency amplifier transistor 28 includes a pair of output terminals 62, one of which is grounded and the other of which is connected through a coupling capacitor 70 to the collector 34. The collector 34 is also returned to ground through a resistor 72. To provide effective squelch action of the audio frequency transistor amplifier 28, the collector 24 of the switch transistor 18 is connected through a resistor 64 to the emitter 32 of the audio frequency transistor amplifier 28. The resistor 64 is by-passed for signal frequencies by a by-pass capacitor 66.

In operation, any noise which appears at the input terminals 40 is amplified by the noise amplifier 6 and applied through the coupling capacitor 50 to the base 16 of the transistor amplifier 8. The gain of the noise amplifier 6 is chosen so that the transistor amplifier 8 will clip or limit the noise signals for a predetermined value of supply voltage. The amplified noise signals in the collector 14 of the noise amplifier 8 are then coupled through the coupling capacitor 54 to the anode of the diode rectifier 15.

The rectified noise signals will put a positive direct current voltage on the base 26 of the switch transistor 18. Since the switch transistor 18 is of N type conductivity, making its base positive will tend to bias it off. This results in a high collector impedance. Thus, the switch transistor 18 represents a high impedance between the supply voltage and the audio frequency amplifier transistor 28. The collector current of the transistor 28 is thus reduced to the point where it is unable to amplify signals which are applied to its base 36. Accordingly, the signal output at the terminals 62 will be substantially zero. As a result, in the presence of unwanted noise signals, there will be substantially no audio frequency signal output from the transistor 28.

As was mentioned hereinbefore, one of the problems attendant noise squelch circuits is caused by variations in the voltage supply. For example, as the engine speed decreases, the automobile generator tends to cut out, causing the supply voltage to decrease. Any variation in the supply voltage will also cause the gain of the noise amplifier 6 to change. For example, if the supply voltage decreases, the gain of the noise amplifier 6 will also decrease. The result is that as the supply voltage is varied, the amplitude of the noise signal which is necessary to open the squelch will also vary. This provides receiver circuit operation which may be unreliable.

In accordance with the present invention, the difficulties presented by variations in the supply voltage are overcome, in general, by varying the bias on the diode rectifier 15 as the supply voltage varies. This is accomplished by the connection from the cathode of the diode 15 through the resistor 46 to the positive supply voltage (terminal 42), and by connecting the anode of the diode 15 to ground through the resistor 56.

Assume that the positive supply voltage decreases for any reason. This will also decrease the gain of the noise amplifier 6 with the result that the amplitude of the available output signal from the noise amplifier 6 will also be decreased. If the bias on the diode 15 is fixed, therefore, the rectified noise signal will provide a base bias for the switch transistor 18 which will be less positive as the supply voltage decreases. By provision of the present invention, however, the diode is biased by the positive supply voltage in the reverse direction. Therefore, as the supply voltage decreases, the reverse bias on the diode rectifier 15 will also decrease.

By varying the reverse bias on the diode 15 as the supply voltage is changed, the noise signal which is applied to the diode 15 will, of course, have less reverse diode bias to overcome. Accordingly, even though the output signal from the transistor 8 is decreased by a decrease in the supply voltage, the positive voltage on the base 26 of the switch transistor 18 will remain substantially constant. In this manner, the amplitude of the noise signal, which is applied at the input terminals 40, which is required to disable the audio amplifier 28 is substantially constant. By provision of the present invention, therefore, the harmful effects which may be caused by a variable supply voltage are substantially eliminated.

A radio signal receiving system of the double superheterodyne type which embodies the invention is illustrated in Figure 2 and comprises, in general, from the input portion of the receiver to its output, an antenna 74, a radio frequency amplifier 76, a high frequency oscillator 78, a high frequency mixer 80, a high intermediate frequency amplifier 82, a low frequency oscillator 84, a low frequency mixer 86, a low intermediate frequency amplifier 88, a limiter discriminator 90, a deemphasis network 92, the first audio frequency transistor amplifier 28, a second audio frequency transistor amplifier 94, a driver transistor 96 and a class B push-pull output stage which includes two transistors 98 and 100. The squelch portion of the receiver includes, in general, a first and a second noise amplifier transistor 108 and 118, the transistor noise amplifier 8, the diode rectifier 15 and the switch transistor 18.

The input electrode or base 116 of the first transistor noise amplifier 108 is connected through a coupling capacitor 117 to the output of the limiter discriminator 90. The output electrode or collector 114 of this transistor is connected through a capacitor 115 to the base 126 of the second transistor noise amplifier 118. The collector 124 of the second transistor noise amplifier 118 is, in turn, connected through the coupling capacitor 50 to the base 16 of the noise amplifier 8, whose collector 14 is connected through the coupling capacitor 54 to the anode of the diode rectifier 15. The circuit connections for the transistor amplifier 8, the diode 15, the switch transistor 18 and from the collector 24 of the switch transistor 18 to the emitter 32 for the first audio amplifier transistor 28 are substantially identical to the ones illustrated in Figure 1 and embody the teachings of the present invention. The squelch circuit in the receiver of Figure 2 thus incorporates the same advantages as the one illustrated in Figure 1.

To provide a remote squelch control for the receiver a potentiometer is provided which comprises a resistor 128 and a variable tap 129. The tap 129 is connected through filtering means comprising a diode 130 and a capacitor 132 which are connected between the cathode of the diode and ground to the emitter 112 of the transistor 108. The diode 130 may be a germanium junction diode of the 1N91 type, for example. By varying the position of the variable tap 129 on the resistor 128, the gain of the transistor amplifier 108 may be varied, thus providing a means for varying the signal threshold.

One difficulty encountered with the provision of a long remote control lead for a radio receiver, particularly when it is used in an automobile, is the fact that ignition noise is readily picked up on the lead, and unless filtered, will be amplified in the noise amplifier and may cut off the audio amplifier. If a resistor or a large enough filter inductor is added in series with the lead, the gain of the transistor amplifier 108 could be reduced to zero. By using the diode 130 and the capacitor 132 as a filter, however, these difficulties are overcome. Thus, since the diode 130 has a small forward resistance, the gain of the transistor 108 may be readily reduced to zero. The diode 130, in addition, clips the positive peaks of unwanted ignition noise so that the capacitor 132 can can effectively by-pass the remainder of the noise which is picked up.

Considering briefly the operation of the receiver as a whole, a desired frequency modulated signal is selected from the antenna 74 and amplified by the radio frequency amplifier 76. The amplified radio frequency signal is then converted to a first frequency modulated intermediate frequency carrier signal in the high frequency mixer 80 through the operation of the high frequency oscillator 78. Thereafter, this signal is amplified by the high intermediate frequency amplifier 82 and converted to a second intermediate frequency carrier signal in the low frequency mixer 86 through the operation of the low frequency oscillator 84. This signal is then further amplified by the low intermediate frequency amplifier 88 wherefrom it is applied to the limiter discriminator 90.

The output of the limiter discriminator 90 is coupled through a deemphasis network 92 and an interstage coupling transformer 93 to the base 36 of the first audio frequency transistor amplifier 28. The audio signal on the collector 34 of transistor 28 is coupled through the coupling capacitor 70 to the base 95 of the second audio frequency transistor amplifier 94 where it is further amplified. The output signal on the collector 97 of the transistor 94 is then coupled to the base 99 of the driver transistor 96 which amplifies the signal which is applied to its base 99. The amplified audio frequency signal on the collector 101 of the driver transistor 96 is then applied through the transformer 103 to the base electrodes 105 and 107 of the respective push-pull output transistors 98 and 100. The resulting push-pull output signal is then coupled through the output transformer 109 to the loudspeaker 102 where it is reproduced.

In the absence of a signal but in the presence of undesired noise, the noise signal is taken from the output of the limiter discriminator 90 and applied to the base 116 of the first noise amplifier transistor 108. The noise is then amplified and applied to the base 126 of the second noise amplifier transistor 118. The noise signal on the collector 124 of the second noise amplifier transistor is then applied to the base 16 of the transistor 8 which is biased as in Figure 1 so that it clips the noise signals for a predetermined value of supply voltage. The noise signals are then rectified by the diode 15 and are used to control the base voltage of the switch transistor 18. The squelch action is then identical to that which was explained in connection with Figure 1. Thus the circuit illustrated in Figure 2 is characterized by the same advantages as the one illustrated in Figure 1 in that the signal threshold is maintained at a substantially constant value despite changes in the supply voltage.

It should be understood that while the invention has been illustrated using junction transistors of P–N–P type, other types of transistors could be readily used. Moreover, the invention is not restricted to transistors of any particular conductivity type. Thus, each of the transistors could be of an opposite conductivity type to those illustrated. For this purpose, if, for example, N–P–N transistors were used, the polarity of the various biasing voltages would have to be reversed as well as the polarity of the diodes 15 and 130. In other respects, the circuit would be identical to the ones illustrated in Figures 1 and 2 and would operate with the same advantages.

While it will be understood that the circuit specifications may vary according to the design for any particular application, the following circuit specifications are included for the circuit of Figures 1 and 2 by way of example only:

| | |
|---|---|
| Transistors 8, 18 and 28 | RCA type TA153. |
| Diode 15 | Type 1N91. |
| Capacitors 54, 58 and 66 | .01; .5; and 25 microfarads respectively. |
| Resistors 46, 56 and 64 | 39,000; 33,000; and 2700 ohms respectively. |

As described herein, noise suppression or squelch circuits for radio signal receiving systems are seen to be effective and reliable in operation. Thus, the squelch circuits function to automatically render the receiver operative when a received carrier wave attains a predetermined amplitude level. At the same time, moreover the input signal threshold does not vary as the supply voltage varies. Thus, the audio amplifier transistor of a receiver is effectively cut off in the presence of noise and the squelch can be easily adjusted to operate at a preset signal threshold which does not change even though the supply voltage changes. Accordingly, the invention is seen to be of particular advantage for use in an automobile where the supply voltage is apt to change quite readily.

What is claimed is:

1. The combination with a signal amplifier stage and a semi-conductor signal amplifying device therefor having an input, an output and a common electrode; of a noise suppression control circuit for said stage comprising, in combination, a transistor having an input, an output and a common electrode; means providing a source of operating potential for said signal amplifying device; conductive circuit means connecting said source of potential, the conductive path defined by the common and output electrodes of said transistor and the common electrode of said signal amplifying device in series; means including a signal rectifier connected with the input electrode of said transistor for applying rectified noise signals thereto; and bias supply means for said retifier including a load impedance element connecting one electrode of said rectifier with said source for applying a reverse bias to said rectifier which is variable in accordance with variations in the voltage of said source; said rectifier providing a voltage in response to said noise signals for rendering said transistor non-conductive whereby said transistor provides a relatively high impedance between said source of operating potential and said signal amplifying device.

2. In a frequency-modulated superheterodyne signal receiver including intermediate frequency amplifier stages, a limiter discriminator stage, a plurality of cascade connected audio frequency transistor amplifier stages, and a plurality of cascade-connected transistor noise amplifier stages, the combination comprising, conductive circuit means connecting the output circuit of said limiter discriminator stage with the input circuit of a first of said transistor noise amplifier stages, means connecting the output circuit of the last of said transistor noise amplifier stages with one of said audio frequency transistor amplifier stages, a signal rectifying device connected in series with the input circuit of said last transistor noise amplifier stage, means providing a source of operating voltage for biasing said transistor noise amplifier stages and audio frequency transistor amplifier stages, and means including a load impedance element connected from a point intermediate said signal rectifying device and the input circuit of said last transistor noise amplifier stage to said source of operating voltage for applying a reverse bias to said rectifying device which is variable in accordance with variations in the voltage of said source, said signal rectifying device providing a bias voltage for said last transistor noise amplifier stage in response to a noise signal for rendering said amplifier non-conductive, whereby said transistor noise amplifier stage provides a relatively high impedance between said source of operating voltage and said one audio frequency transistor amplifier stage and noise suppression of said receiver is obtained.

3. In a signal receiver, the combination with a semi-conductor switch device and a semi-conductor signal amplifying device each including an input, an output and a common electrode, of means connecting the output electrode of said switch device with the common electrode of said signal amplifying device, means providing a source of operating potential connected between the common electrode of said switch device and the output electrode of said signal amplifying device, a unilateral conducting element connected with the input electrode of said switch device and including a pair of electrodes, means connecting one of the electrodes of said unilateral conducting element to a point of reference potential, means connecting said source of operating potential with the common electrode of said switch device and with the other electrode of said unilateral conducting element for applying a reverse bias to said element which is variable in accordance with variations in the potential of said source, and means providing a source of noise signals connected with said one of said electrodes of said unilateral conducting element, said unilateral conducting element providing a voltage in response to said noise signals for rendering said switch device non-conductive whereby said switch device provides a relatively high impedance between said source of operating potential and said signal amplifying device and noise squelching of said signal receiver is obtained.

4. In a signal receiver the combination with a noise amplifier transistor, a switch transistor and an audio frequency amplifier transistor, each of said transistors including a base, a collector and an emitter electrode, of a diode rectifier serially connected between the collector electrode of said noise amplifier transistor and the base electrode of said switch transistor and including a pair of electrodes, mean including a resistor connecting the electrodes of said diode rectifier nearest said noise amplifier transistor to a point of reference potential, means including a resistor connecting the collector electrode of said switch transistor with the emitter electrode of said audio frequency amplifier transistor, means providing a source of supply voltage connected with the emitter electrode of said switch transistor and with the other electrode of said diode rectifier for applying a reverse bias to said rectifier which is variable in accordance with variations in the voltage of said supply voltage, means for connecting the collector-to-emitter circuits of said switch transistor and said audio frequency amplifier transistor in series with said means providing a source of supply voltage, and means providing a source of noise signals connected with the base electrode of said noise amplifier transistor, said diode rectifier providing a direct current bias voltage for the base electrode of said switch transistor in response to said noise signals for rendering said switch transistor non-conductive whereby the collector electrode of said switch transistor provides a relatively high impedance between said supply voltage and said audio frequency amplifier transistor and noise squelch of signal receiver is obtained.

5. A signal receiver as defined in claim 4 wherein said diode rectifier includes a cathode and an anode, said cathode being connected to the base electrode of said switch transistor, and said anode being connected to said point of reference potential, and wherein each of said transistors is of N type conductivity.

6. A signal receiver as defined in claim 4 wherein said diode rectifier includes a cathode and an anode, said anode being connected to the base electrode of said switch transistor, and said cathode being connected to said point of reference potential, and wherein each of said transistors is of P type conductivity.

7. In a signal receiver, the combination comprising a first and a second transistor each including a base, a collector and an emitter electrode, and means connecting the collector electrode of said first transistor with the emitter electrode of said second transistor, means providing a source of operating potential for said receiver, means for connecting the emitter electrode of said first transistor and the collector electrode of said second transistor across said means providing a source of operating potential, a diode serially connected with the base electrode of said first transistor and including a pair of electrodes, means connecting one of the electrodes of said diode to a point of reference potential, means connecting said source of operating potential with the other electrode of said diode for applying a reverse bias to said diode which is variable in accordance with variations in the potential of said source, and means providing a source of signals connected with said one of said electrodes of said diode, said diode providing a voltage in response to said signals for rendering said first transistor nonconductive whereby said first transistor provides a relatively high impedance between said source of biasing potential and said second transistor.

8. In a signal receiver the combination with a semi-conductor switch device and a semi-conductor signal amplifying device each including an input, an output and a common electrode, of means connecting the output electrode of said switch device with the common electrode of said signal amplifying device, direct current potential supply means for said receiver, means for connecting the common electrode of said switch device and the output electrode of said signal amplifying device across said direct current potential supply means of a unilateral conducting element connected with the input electrode of said switch device and including a pair of electrodes, circuit means for maintaining one of the electrodes of said unilateral conducting element at a substantially fixed potential, means for connecting the common electrode of said switch device and with the other electrode of said unilateral conducting element for applying a biasing voltage in the relatively non-conducting direction to said element which is variable in accordance with variations in the potential of said source, and noise signal input means connected with said one of said electrodes of said unilateral conducting element.

9. In a signal receiver the combination with a semi-conductor switch device and a semi-conductor audio frequency amplifier device, each of said semi-conductor devices including a base, a collector and an emitter electrode, of a unilateral conducting element serially connected with the base electrode of said switch device and including a pair of electrodes, means including a resistor connecting one of the electrodes of said unilateral conducting element to a point of reference potential, means including a resistor connecting the collector electrode of said switch device with the emitter electrode of said audio frequency amplifier device, a source of supply voltage, means for connecting the collector-to-emitter paths of said switch device and said audio frequency amplifier device in series across said source of supply voltage, a resistor serially connected between said source of supply voltage and a point intermediate the other electrode of said unilateral conducting element and the base electrode of said switch device and providing biasing voltages for said element in the reverse direction which are variable in accordance with variations in the voltage of said source of supply voltage, and means providing a source of noise signals connected with the input electrode of said noise amplifier device, said unilateral conducting element providing a direct current bias voltage for the base electrode of said switch device in response to said noise signals for rendering said switch device non-conductive whereby said switch device provides a relatively high impedance between said supply voltage and said audio frequency amplifier device and noise squelch of said signal receiver is obtained.

10. In a superheterodyne signal receiver the combination with a plurality of cascade connected semi-conductor noise amplifier devices, a semi-conductor switch device and at least one semi-conductor audio frequency amplifier device, each of said semi-conductor devices including a base, a collector and an emitter electrode, of a diode serially connected between the collector electrode of a first of said noise amplifier devices and the base electrode of said switch device and including a pair of electrodes, means connecting one of the electrodes of said diode to a point of reference potential, means connecting the collector electrode of said switch device with the base electrode of said first audio frequency amplifier device, means providing a source of supply voltage connected with the emitter electrode of said switch device and with the other electrode of said diode for applying a reverse bias to said diode which is variable in accordance with variations in the voltage of said source, and means providing a source of noise signals connected with the base electrode of a second of said noise amplifier devices, said diode providing a direct current bias voltage for the base electrode of said switch device in response to said noise signals for rendering said switch device non-conductive whereby said switch device provides a relatively high impedance between said supply voltage and said audio frequency amplifier devices and noise squelch of said signal receiver is obtained, remote control squelch means for varying the gain of said second noise amplifier device, and conductive circuit means including a second diode poled for forward conduction in a direction opposite to that of normal emitter current flow of said second base amplifier connected between said remote control squelch means and the emitter electrode of said second noise amplifier device, and a by-pass capacitor connected in shunt with said remote control squelch means to provide by-passing of unwanted noise in said receiver.

11. The combination with a signal amplifier stage and a semi-conductor signal amplifying device therefor having an input, an output and a common electrode; of a noise suppression control circuit for said stage comprising in combination, a transistor having an input, an output and a common electrode; means providing a source of operating potential for said signal amplifying device; conductive circuit means connecting said source of potential, the conductive path defined by the common and output electrodes of said transistor and the common electrode of said signal amplifying device in series; means including a signal rectifier connected with the input electrode of said transistor for applying rectified noise signals thereto; and a load impedance element connected to said rectifier and also connected between the input and common electrodes of said transistor, said rectifier and load impedance element providing a voltage in response to said noise signals for rendering said transistor non-conductive whereby said transistor provides a relatively high impedance between said source of operating potential and said signal amplifying device.

12. The combination with a signal amplifier stage and a semi-conductor signal amplifying device therefor having an input, an output and a common electrode; of a noise suppression control circuit for said stage comprising in combination, a transistor having an input, an output and a common electrode; means providing a source of operating potential for said signal amplifying device; conductive circuit means connecting said source of potential, the conductive path defined by the common and output electrodes of said transistor and the common electrode of said signal amplifying device in series; means including a signal rectifier connected with the input electrode of said transistor for applying rectified noise signals thereto; a load impedance element connected to said rectifier and also connected between the input and common electrodes of said transistor, said rectifier and load impedance element providing a voltage in response to said noise signals for rendering said transistor non-conductive whereby said transistor provides a relatively high impedance between said source of operating potential and said signal amplifying device, said transistor, rectifier and load impedance element being connected with said source of operating potential in a manner to delay the rendering of said transistor non-conductive until said noise signals exceed a predetermined level.

No references cited.